(12) United States Patent
Casey et al.

(10) Patent No.: US 10,610,780 B1
(45) Date of Patent: Apr. 7, 2020

(54) PRE-LOADED CONTENT ATTRIBUTE INFORMATION

(71) Applicant: Amazon Technologies, Inc., Seattle, WA (US)

(72) Inventors: Christopher Jonathan Casey, Redmond, WA (US); Stefan Vincent Bikun, Bellevue, WA (US); Bryan Gregory Burrows Armstrong, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 14/630,425

(22) Filed: Feb. 24, 2015

(51) Int. Cl.
*A63F 13/352* (2014.01)
*A63F 13/358* (2014.01)
*A63F 13/335* (2014.01)
*A63F 9/24* (2006.01)
*A63F 13/355* (2014.01)
*A63F 13/77* (2014.01)
*A63F 13/338* (2014.01)

(52) U.S. Cl.
CPC .............. *A63F 13/352* (2014.09); *A63F 9/24* (2013.01); *A63F 13/335* (2014.09); *A63F 13/358* (2014.09); *A63F 13/338* (2014.09); *A63F 13/355* (2014.09); *A63F 13/77* (2014.09)

(58) Field of Classification Search
CPC ........ A63F 13/352; A63F 13/358; A63F 9/24; A63F 13/335; A63F 13/338; A63F 13/355; A63F 13/77
See application file for complete search history.

(56) References Cited

U.S. PATENT DOCUMENTS

| 7,677,979 | B2 * | 3/2010 | Van Luchene | A63F 13/352 463/42 |
| 9,332,087 | B2 * | 5/2016 | Morrison, III | H04L 67/32 |
| 2008/0188311 | A1 * | 8/2008 | Topham | G06Q 50/34 463/42 |
| 2012/0283017 | A1 * | 11/2012 | Ahiska | A63F 13/77 463/40 |
| 2014/0228108 | A1 * | 8/2014 | Bruno, Jr. | G06F 12/00 463/29 |
| 2017/0252647 | A1 * | 9/2017 | Perry | A63F 13/335 |

* cited by examiner

Primary Examiner — William H McCulloch, Jr.
Assistant Examiner — Yingchuan Zhang
(74) Attorney, Agent, or Firm — BakerHostetler

(57) ABSTRACT

Techniques for providing of content using pre-loaded content attribute information are described herein. In some cases, a plurality of compute nodes may be grouped into multiple different compute node groups. Each of the multiple different compute node groups may include one or more compute nodes loaded with information associated with one or more assigned content attribute values. A request for content may be received from a client. The request may be associated with one or more requested content attribute values. The request may then be processed by selecting, based, at least in part, on the requested content attribute values, a selected compute node group to handle the request.

13 Claims, 11 Drawing Sheets

PRE-LOADED CONTENT ATTRIBUTE INFORMATION

BACKGROUND

Many technical advances have improved our ability to transmit data between devices. Accordingly, transmission of content items, such as video games, between devices is becoming increasingly popular. For example, in some cases, a video game may be rendered, in whole or in part, at a content delivery server, and transmitted to a remote client device using, for example, a streaming content delivery session. In some cases, the client may experience a delay in receiving the transmitted content during times when the content delivery server is loading information associated with one or more content attributes. For example, when a user initiates a particular level of play associated with a video game, a client may experience a delay as the content delivery server loads information associated with the particular video game level. In some cases, the content server may also load information associated with other content attributes, such as locations, weapons, characters, story lines, play styles, degrees of difficulty, and the like. In some cases, the delays resulting from loading of information associated with these and other content attributes may be significant. The delays may sometimes negatively impact the user experience and may discourage a user from playing particular content items or from using particular content item delivery services.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Techniques for providing of content using pre-loaded content attribute information are described herein. In some cases, a content provider may operate, or otherwise access, a number of different compute nodes, such as servers and/or virtual machines, for providing of content, such as video games, to clients. The content provider may, for example, group these different compute nodes into multiple different compute node groups. Each of the multiple different compute node groups may include one or more compute nodes loaded with information associated with one or more assigned content attribute values, such as one or more particular video game levels, locations, weapons, characters, story lines, play styles, degrees of difficulty, and the like. For example, in some cases, each of the compute node groups may be assigned a different video game level and may include compute nodes pre-loaded with information associated with the assigned video game level.

In some examples, a request for content may be received from a client. The request may be associated with one or more requested content attribute values. For example, the client may request a content delivery session for a particular level of a video game. The request may then be processed by selecting, based, at least in part, on the requested content attribute values, a selected compute node group to handle the request. In some cases, the selected compute node group may be determined by, for example, matching one or more of the requested content attribute values to one or more content attribute values assigned to the selected compute node group. For example, if a client requests a particular video game level, then, in some cases, a compute node group to which the particular requested video game level is assigned may be selected to handle the request. One or more compute nodes from the selected compute node group may then be instructed to stream the requested content to the requesting client.

Figure 1:
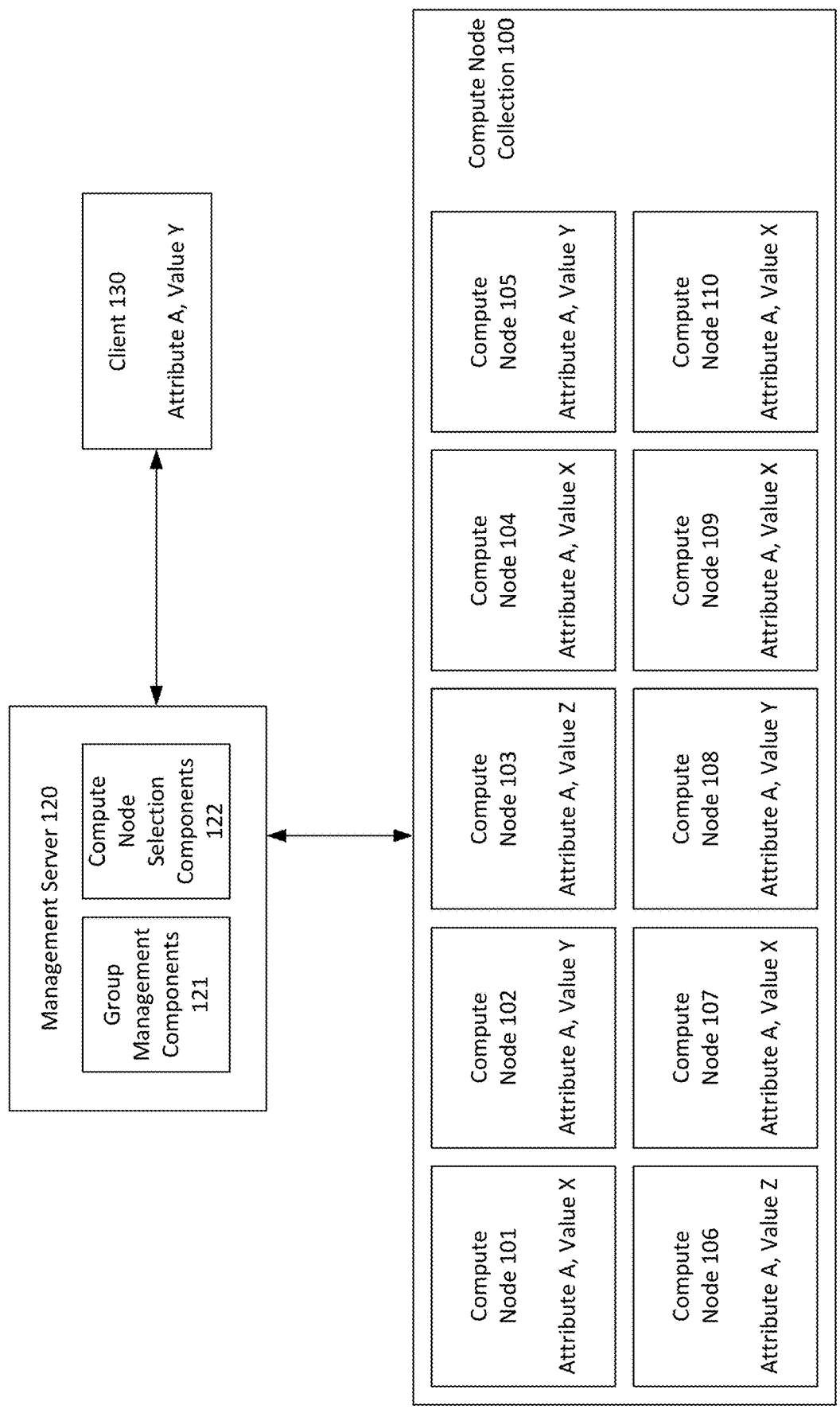
FIG. 1 is a diagram illustrating an example content delivery system that may be used in accordance with the present disclosure.

FIG. 1 is a diagram illustrating an example content delivery system that may be used in accordance with the present disclosure. As shown in FIG. 1, a management server 120 may communicate with compute nodes 101-110 within compute node collection 100. A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

In some examples, any, or all, of compute nodes 101-110 may include one or more servers and/or one or more virtual machines. Also, in some cases, each of compute nodes 101-110 may include, or may have access to, one or more content processing components, such as one or more graphics processing units, audio processing components, and the like. It is noted that, while example compute node collection 100 includes ten compute nodes, any number of different compute nodes may be employed in accordance with the disclosed techniques. It is further noted that compute node collection 100 is not limited to any particular number of devices or any particular geographic and/or physical characteristics. For example, in some cases, compute nodes 101-110 may be located in a single data center and/or may include devices in close geographic proximity to one another. By contrast, in other cases, one or more of compute nodes 101-110 may be distributed across multiple data centers and/or may include devices that are geographically remote from one another. Moreover, it is noted that the functionality of management server 120, or any portions or components thereof, may be spread across any number of different compute nodes at any number of different locations with respect to one another. There is no requirement that management server 120, or any portions or components thereof, must be within any particular geographic proximity to any, or all, of compute nodes 101-110.

As shown in FIG. 1, management server 120 includes group management components 121, which may generally perform operations relating to management of a number of logical compute node groups. In particular, group management components 121 may perform operations, such as selecting the compute node groups, determining one or more content attribute values to assign to each of the compute node groups, determining which of the compute nodes 101-110 to assign to each of the compute node groups, and instructing each compute node 101-110 to load information associated with the content attribute values assigned to its corresponding compute node group.

In some examples, group management components 121 may access information that identifies various different content attributes and content attribute values associated with a content item. A content attribute is a content feature that may vary across different instances of use of the content. In some cases, for a content item, such as a video game, respective content attributes may include, for example, video game levels, locations, weapons, characters, story lines, play styles, degrees of difficulty, and the like. A content attribute value is a particular value of a content attribute, such as a particular video game level, a particular location, a particular weapon, a particular character, a particular story line, a particular play style, a particular degree of difficulty, and the like. It is noted that a location content attribute value may be, for example, a particular location associated with the content item, such as a virtual location in which the content item, or any portions thereof, may take place, such as a castle, a battlefield, a city, and the like.

Also, in some examples, group management components 121 may compute, maintain, and/or access information that indicates an amount of users expected to request content associated with one or more of the identified content attribute values. In some cases, the information may indicate relative amounts of users that are expected to request particular attribute values. Also, in some cases, the information may indicate one or more time periods associated with the indicated expectations. For example, information may indicate that, for the next week, for a particular video game, fifty percent of players are expected to request level 2, thirty percent of players are expected to request level 3, and twenty percent of players are expected to request level 4.

In some cases, expectations may vary depending upon particular time periods, such as particular times of a day, month or year. For example, in some cases, it may be determined that more experienced game players tend to play more often at night time and, therefore, that more advanced video game levels may be more frequently requested at night time. As another example, certain video games may have periodic events or promotions scheduled in association with particular attributes. For example, during the month of January, an event may be scheduled that provides players with additional weapons or other game awards when they complete level 4. In these cases, it may sometimes be reasonable to assume that level 4 will be more frequently requested during the month of January than it may be during other months.

Also, in some cases, group management components 121 and/or other components may monitor any, or all, of compute nodes 101-110 and/or other compute nodes and record information associated with requested content attributes and/or content attribute values. As should be appreciated, in some cases, additional monitoring components, monitoring services and/or other external data may be employed or accessed to provide data associated with requests to compute nodes 101-110 and/or other compute nodes that are not necessarily affiliated with or managed by management server 120. In some cases, compute nodes may be monitored over an extended period of time to collect historical data associated with larger amounts of user requests throughout extended time durations. By contrast, in other cases, only current and/or recent data regarding user requests may be considered, as this data may sometimes be considered more reliable than older, historical data. The disclosed techniques do not necessarily require monitoring of user requests, nor do they require any particular timeframe during which monitoring is necessarily expected to be performed.

Group management components 121 may also access information that indicates an expected amount of time required to load information associated with various content attributes and/or content attribute values. For example, it may sometimes be determined that loading of information associated with video game levels may require a relatively long latency period in order to load onto one or more compute nodes. By contrast, it may sometimes be determined that information associated with other content attributes, such as various weapons, various characters or various degrees of difficulty, may require relatively shorter latency periods in order to load onto one or more compute nodes. The expected loading times may be determined, for example, based on factors, such as the size, format, and/or complexity of information associated with various content attributes and/or content attribute values. The expected loading times may also be determined, for example, by monitoring and observing actual loading wait times associated with various content attributes and/or content attribute values by compute nodes 101-110 and/or other compute nodes.

Group management components 121 may use information, such as that described above and/or other information, to make various determinations regarding various logical compute node groups to which to assign one or more content attribute values. In general, group management components 121 may group compute nodes 101-110 into multiple different logical compute node groups. Each logical compute node group may include one or more compute nodes that are loaded with information associated with the content attribute values that are assigned to the corresponding compute node group. When a client, such as client 130, requests content in accordance with one or more content attribute values, the request may be assigned to a compute node in a particular one of the compute node groups with assigned content attribute values that match the content attributes that are requested by the client. In this way, the requested content attributes may already be loaded (i.e., pre-loaded) by the compute node that is assigned to handle the client request, and the latency period required to load information associated with the requested attribute values may be reduced or, in some cases, possibly eliminated.

In some cases, group management components 121 may assign content attribute values to one or more compute node groups based, at least in part, on the latency period required to load information associated with various content attributes and/or attribute values. For example, in some cases, if it is determined that information associated with certain content attribute values requires a relatively longer loading time period, then group management component 121 may sometimes be more likely to select those content attribute values for assignment to one or more compute node groups.

By contrast, in some cases, if it is determined that information associated with certain other content attribute values requires a relatively shorter loading time period, then group management component 121 may sometimes be less likely to select those other content attribute values for assignment to one or more compute node groups. In some cases, this reasoning may be based on a determination, for example, that it is more advantageous for information associated with content attribute values that require a longer load time to be pre-loaded, as this may have a greater effect on reducing loading wait times for clients that request content in accordance with those content attribute values. By contrast, pre-loading information associated with content attribute values that require a shorter load time may not have as great an effect on reducing loading wait times for clients that request content in accordance with those content attribute values.

Also, in some cases, group management components 121 may assign content attribute values to one or more compute node groups based, at least in part, on an amount of user requests, such as a current, historic, and/or expected future amounts of user requests for various content attributes and/or attribute values. For example, in some cases, if it is determined that certain content attribute values are more frequently requested, then group management component 121 may sometimes be more likely to select those content attribute values for assignment to one or more compute node groups. By contrast, in some cases, if it is determined that certain other content attribute values are less frequently requested, then group management component 121 may sometimes be less likely to select those other content attribute values for assignment to one or more compute node groups. In some cases, this reasoning may be based on a determination, for example, that it is more advantageous for more information associated with frequently requested content attribute values to be pre-loaded onto different compute nodes, as this may reduce loading wait times for a greater amount of requesting clients. By contrast, pre-loading information associated with less frequently requested content attribute values may reduce wait times for fewer requesting clients.

Also, in some cases, group management components 121 may assign content attribute values to one or more compute node groups based, at least in part, on any combination of the above or other factors. For example, in some cases, content attribute values that both require longer load times and that are frequently requested may be highly likely to be assigned to compute node groups, as preloading of information associated with these content attribute values may sometimes be determined to significantly reduce content loading times for large numbers of users. As another example, in some cases, if multiple content attribute values are assigned to one or more compute node groups, the assignments may sometimes be based on an expected likelihood that the multiple content attribute values may be selected together by particular clients. For example, if particular clients are likely to request a particular degree of difficulty in combination with a particular video game level, then it may sometimes be advantageous to assign both the particular degree of difficulty and the particular video game level as content attribute values to one or more compute node groups.

Figure 2A:
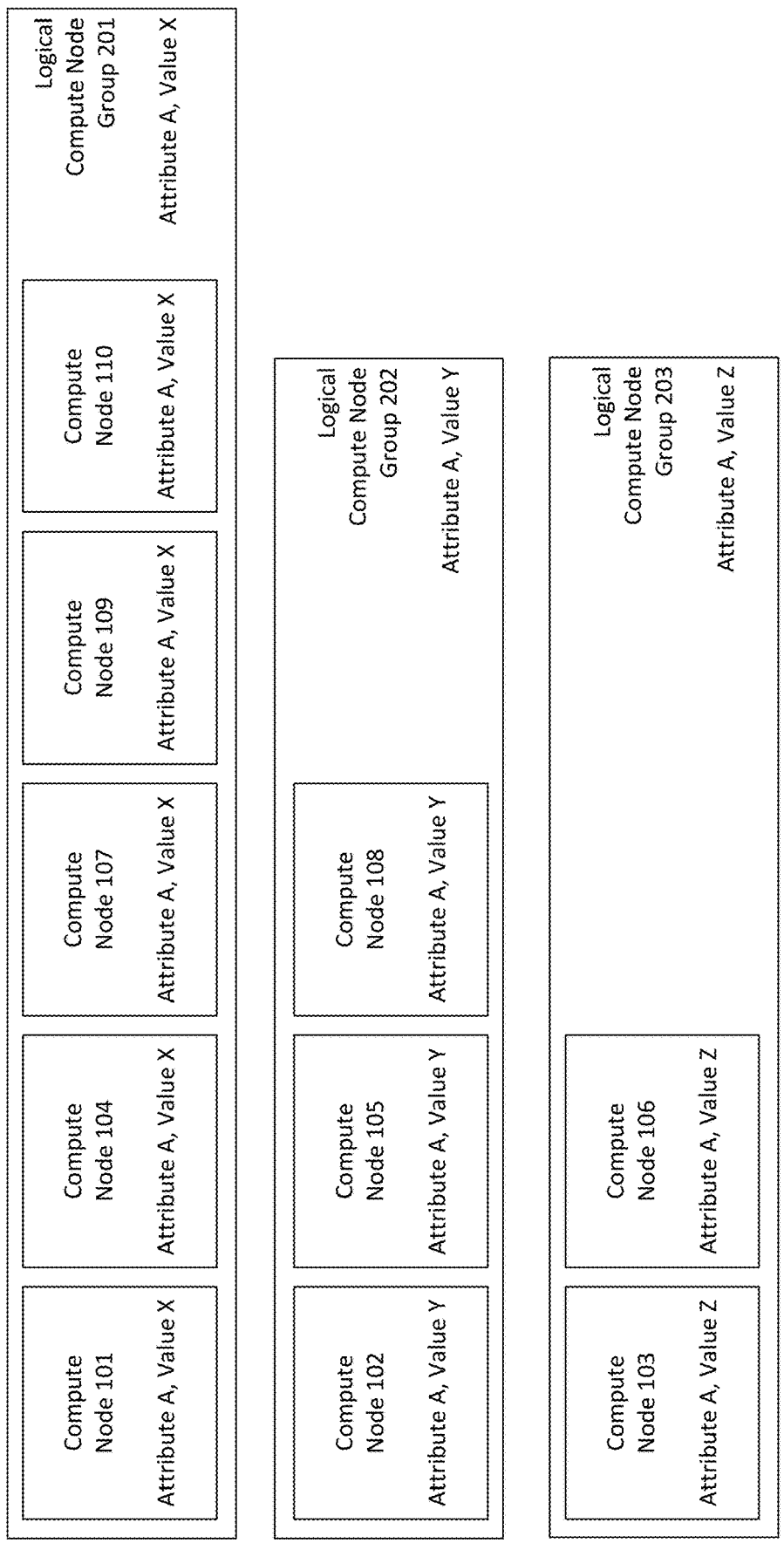
FIGS. 2A-2D are diagrams illustrating example compute node groups that may be used in accordance with the present disclosure.

In the particular example of FIG. 1, it can be seen that three different content attribute values (Value X, Value Y, and Value Z) for a content attribute (Attribute A) are assigned to compute nodes 101-110. In particular, Value X is assigned to compute nodes 101, 104, 107, 109, and 110, Value Y is assigned to compute nodes 102, 105, and 108, and Value Z is assigned to compute nodes 103 and 106. Referring now to FIG. 2A, it can be seen that, based on the content attribute value assignments shown in FIG. 1, compute nodes 101-110 are grouped into three logical compute node groups 201, 202, and 203. Specifically, as shown in FIG. 2A, logical compute node group 201 is assigned Value X and includes compute nodes 101, 104, 107, 109, and 110, logical compute node group 202 is assigned Value Y and includes compute nodes 102, 105, and 108, and logical compute node group 203 is assigned Value Z and includes compute nodes 103 and 106. Accordingly, in the example of FIG. 2A, each compute node in logical compute node group 201 may be pre-loaded with information associated with Value X, each compute node in logical compute node group 202 may be pre-loaded with information associated with Value Y, and each compute node in logical compute node group 203 may be pre-loaded with information associated with Value Z.

Figure 2B:
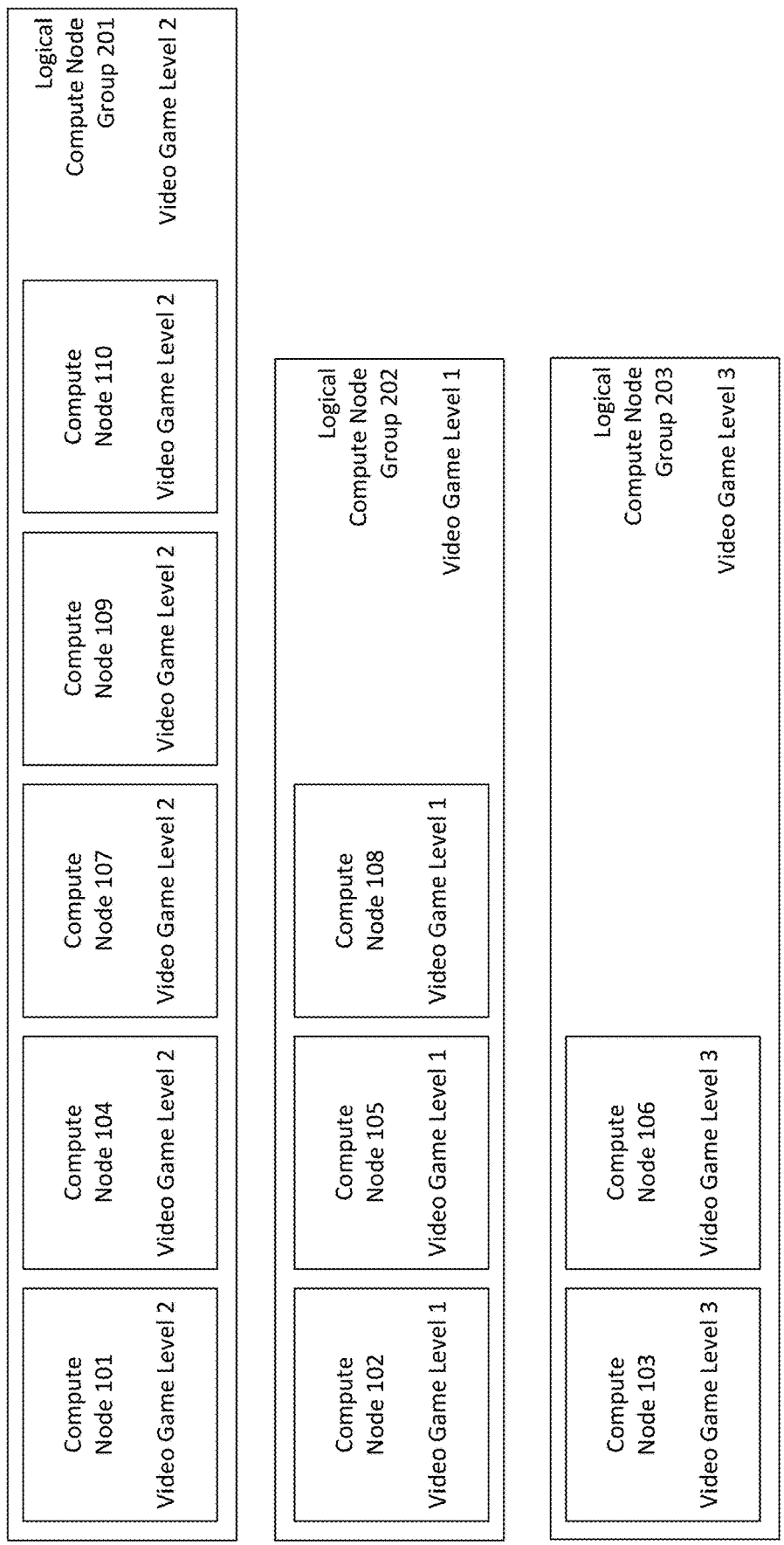

As should be appreciated, Attribute A, and Values X, Y and Z of FIG. 1 may represent a particular content attribute and content attribute values, including any of the examples described above. Referring now to FIG. 2B, a particular example is described in which Attribute A of FIG. 1 represents a video game level attribute and Values X, Y, and Z of FIG. 1 represent particular video game levels. Specifically, in the particular example of FIG. 2B, Value X represents Video Game Level 2, Value Y represents Video Game Level 1, and Value Z represents Video Game Level 3. Thus, in the particular example of FIG. 2B, logical compute node group 201 is assigned Video Game Level 2 and includes compute nodes 101, 104, 107, 109, and 110, logical compute node group 202 is assigned Video Game Level 1 and includes compute nodes 102, 105, and 108, and logical compute node group 203 is assigned Video Game Level 3 and includes compute nodes 103 and 106. Accordingly, in the example of FIG. 2B, each compute node in logical compute node group 201 may be pre-loaded with information associated with Video Game Level 2, each compute node in logical compute node group 202 may be pre-loaded with information associated with Video Game Level 1, and each compute node in logical compute node group 203 may be pre-loaded with information associated with Video Game Level 3.

Figure 2C:
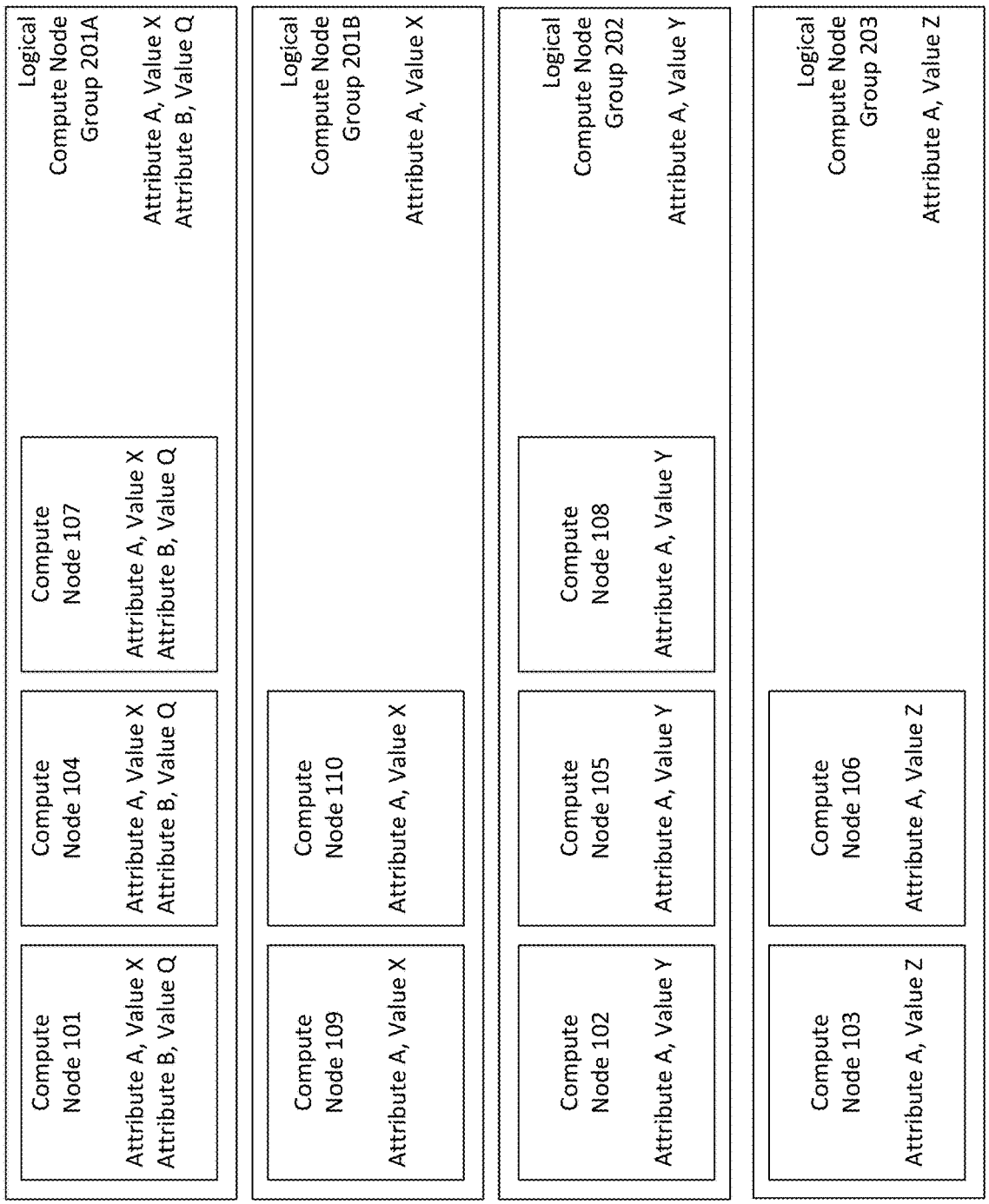

As set forth above, in some cases, one or more compute node groups may be pre-loaded with information associated with multiple different content attribute values for multiple different content attributes. Referring now to FIG. 2C, an example is described in which compute nodes 101-110 are grouped into four different logical compute node groups 201A, 201B, 202, and 203. In the particular example of FIG. 2C logical compute node group 201A is assigned two content attribute values for two content attributes. Specifically, in the example of FIG. 2C, logical compute node group 201A includes compute nodes 101, 104, and 107 is assigned Attribute A, Value X and Attribute B, Value Q. Accordingly, in the example of FIG. 2C, each compute node in logical compute node group 201A may be pre-loaded with information associated with Attribute A, Value X and also with information associated with Attribute B, Value Q. Also, in the example of FIG. 2C, logical compute node group 201B includes compute nodes 109 and 110 and is assigned Attribute A, Value X. It is noted, however, that logical compute node group 201B is not assigned a value for Attribute B. Accordingly, in the example of FIG. 2C, each compute node in logical compute node group 201B may be pre-loaded with information associated with Attribute A, Value X. However, the compute nodes in logical compute node group 201B are not pre-loaded with information associated with any particular content attribute value for Attribute B. It is noted that, in FIG. 2C, the included compute nodes and content attribute value assignments for logical compute node groups 202 and 203 are identical to those described above and shown in FIG. 2A.

Figure 2D:
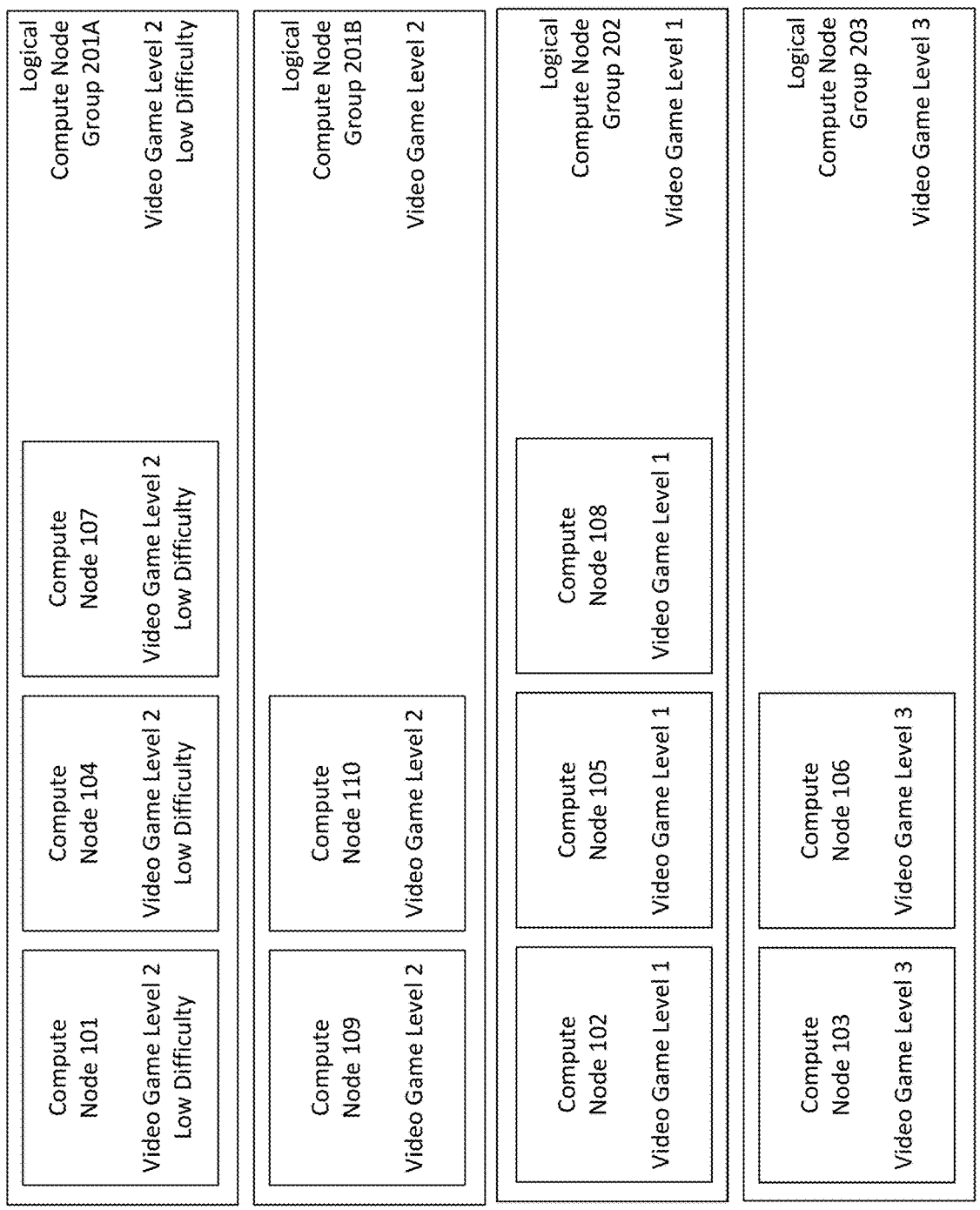

Referring now to FIG. 2D, a particular example is described, in which Attribute B of FIG. 2C represents a degree of difficulty attribute and Value Q of FIG. 2C represents a low degree of difficulty. It is further noted that, in FIG. 2D, Attribute A of FIG. 2C once again represents video game levels, with Value X again representing level 2, Value Y again representing level 1, and Value Z again representing level 3. Thus, in the particular example of FIG. 2D, logical compute node group 201A is assigned Video Game Level 2 and Low Difficulty, logical compute node group 201B is assigned Video Game Level 2, logical compute node group 202 is assigned Video Game Level 1, and logical compute node group 203 is assigned Video Game Level 3. Accordingly, in the example of FIG. 2B, each compute node in logical compute node group 201A may be pre-loaded with information associated with Video Game Level 2 and with information associated a low degree of difficulty, each compute node in logical compute node group 201B may be pre-loaded with information associated with Video Game Level 2, each compute node in logical compute node group 202 may be pre-loaded with information associated with Video Game Level 1, and each compute node in logical compute node group 203 may be pre-loaded with information associated with Video Game Level 3.

A number of different reasons may exist for determining that multiple different content attribute values should be assigned to logical compute node group 201A of FIG. 2D. For example, in some cases, it may be determined that a high proportion of clients are requesting Video Game Level 2 with a low degree of difficulty relative to other levels of difficulty (e.g., moderate, high, etc.). This may be because, for example, Video Game Level 2 is a very challenging level and many clients are requesting a lower degree of difficulty because the level is highly challenging relative to other levels. Thus, for example, it may be determined that pre-loading information for a low degree of difficulty in combination with Video Game Level 2 may significantly reduce loading wait times for large numbers of clients.

Referring back to FIG. 1, it is seen that management server 120 also includes compute node selection components 122, which may generally perform operations relating to selecting one or more of compute nodes 101-110 to handle requests for content from requesting clients, such as client 130. As should be appreciated, although only a single client 130 is shown in FIG. 1, management server 120 may receive requests for content from any number of different clients. In particular, compute node selection components 122 may receive a request for content from a requesting client, such as client 130. The request may be associated with one or more content attribute values that are requested by the requesting client. In the particular example of FIG. 1, it is seen that client 130 has sent a request for content that is associated with Attribute A, Value Y (as indicated, in FIG. 1, by the words Attribute A, Value Y displayed within the box depicting client 130). As set forth above, in some examples, Attribute A, Value Y may represent a particular requested content attribute and value, such as a particular requested video game level (e.g., Video Game Level 1). As should be appreciated, in some cases, more than one content attribute value may be requested by a particular client. In some cases, a client may provide data indicating three requested content attribute values, such as a particular video game level, a particular degree of difficulty, and a particular weapon. For example, a client may request to play Video Game Level 1 with a low degree of difficulty and a Samurai sword for use as a weapon.

After receiving an indication of requested content attribute values from client 130, compute node selection components 122 may select, based, at least in part on the requested content attribute values, a particular compute node group for handling the request and providing content to client 130. In particular, in some cases, the selected compute node group may be determined by matching one or more of the content attribute values requested by client 130 to one or more content attribute values assigned to a particular compute node group. For example, because client 130 has requested Attribute A, Value Y, compute node selection components 122 may match the content attributes requested by client 130 to logical compute node group 202 of FIG. 2A, which includes compute nodes 102, 105, and 108.

After selecting logical compute node group 202 to handle the request from client 130, may then select one or more of the compute nodes within logical compute node group 202 to handle the request. In some cases, to assist with this determination, compute node selection components 122 may maintain, or otherwise access, information associated with compute nodes 101-110, such as status information (e.g., available, busy, offline, etc.), physical location information, and the like. For example, in some cases, compute node selection components 122 may first determine which compute nodes within logical compute node group 202 are available (e.g., not being used to deliver content to another client) to handle the content request from client 130. After identifying available compute nodes within logical compute node group 202, a particular compute node may then be selected based on any combination of other factors. For example, a compute node may be selected based on its physical geographic proximity to the requesting client 130. In some cases, an available compute node within logical compute node group that is geographically closest to client 130 may be selected to handle the request from client 130, as this may sometimes reduce latency for transmission to client 130.

Figure 3:
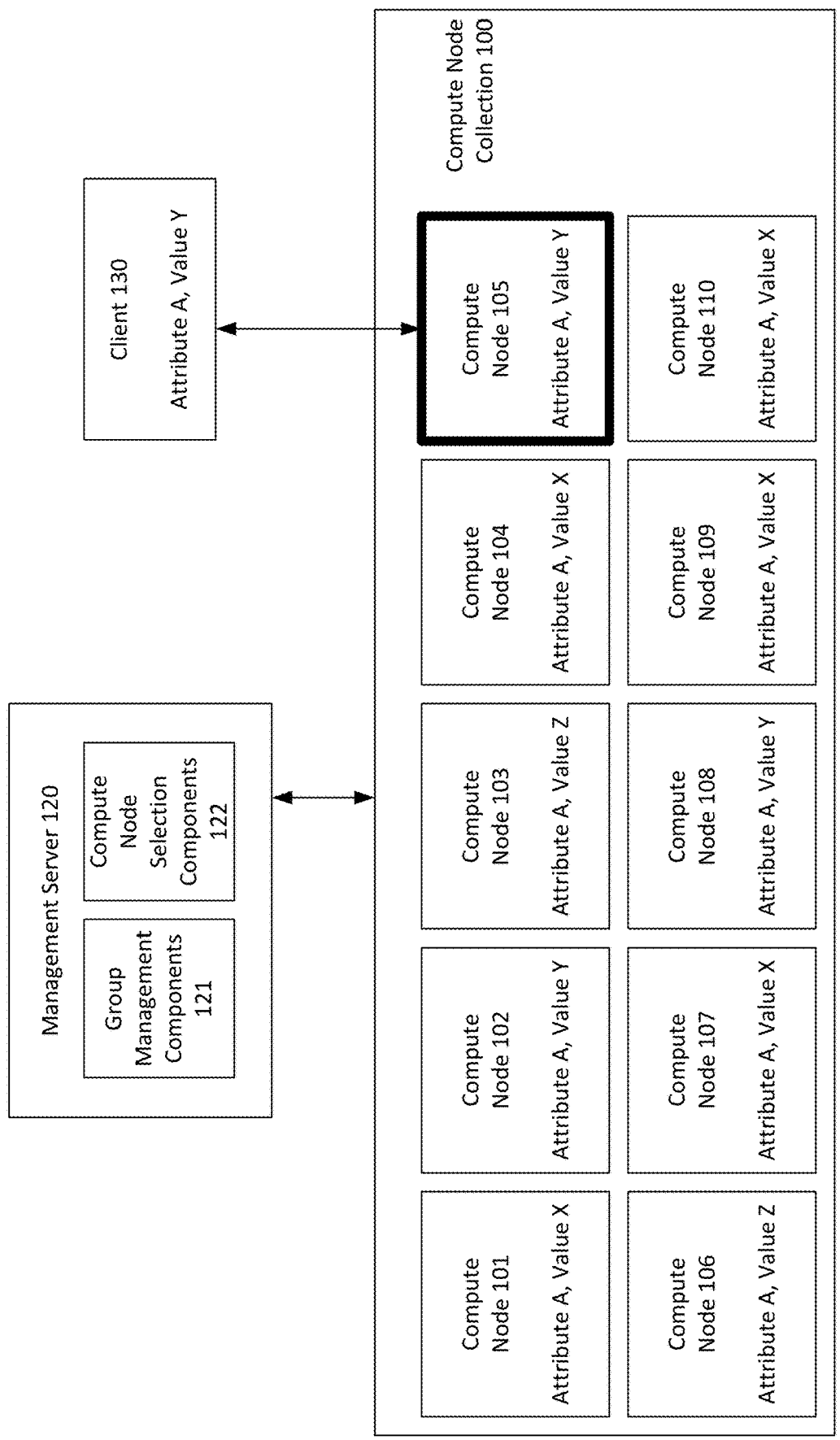
FIG. 3 is a diagram illustrating an example content delivery path that may be used in accordance with the present disclosure.

Referring now to FIG. 3, it is seen that compute node selection components 122 have selected compute node 105 to handle the content delivery request from client 130 and to provide content for transmission to client 130. This is indicated, in FIG. 3, by the thick black box surrounding compute node 105 and the line and arrows between compute node 105 and client 130. After selecting compute node 105 to provide content to client 130, compute node selection components 122 may send a message to compute node 105 instructing compute node 105 to provide content to client 130. For example, compute node 105 may be instructed to launch a content delivery session with client 130. As should be appreciated, however, information associated with Attribute X, Value Y is already pre-loaded onto compute node 105 prior to launching of the content delivery session with client 130, which may include, for example, streaming the content to the client 130. Accordingly, because compute node 105 is pre-loaded with information associated with Attribute X, Value Y, client 130 does need to wait for compute node 105 to load this information, and the loading wait time associated with launching of the content delivery session may, in some cases, be significantly reduced.

Along with instructions to provide content to client 130, compute node 105 may also be provided with additional data associated with the client 130 for use in providing content to the client 130. This additional data may include, for example, an indication of one or more content attribute values that are requested by client 130 but that have not been pre-loaded onto compute node 105. The selected compute node may then, for example, load information associated with the additional data. For example, in addition to Attribute X, Value Y, client 130 may request particular weapons, characters, and a degree of difficulty for playing of a requested video game. It is noted that, in some cases, a selected compute node may be pre-loaded with information that does not match various content attribute values requested by a client. For example, a selected compute node group may be pre-loaded with information for a high degree of difficulty when a client has requested a low degree of difficulty. In such cases, the information associated with the non-matching content attribute values may be deleted from the selected compute node and, if necessary, replaced with matching content attribute value information.

Once a particular compute node is selected and, if necessary, loaded with any information corresponding to additional data associated with the requesting client, the selected compute node may provide the requested content to the requesting client. As set forth above, in some examples, the content may be delivered and presented using streaming content delivery techniques. Streaming content delivery techniques, as generally understood in the art, may allow content to be transmitted over a network such that portions of the content may be presented at the same time, or near the same time, that subsequent portions of the content are being received. As also set forth above, in some cases, compute node 105 may include, or may have access to, one or more content processing components, such as one or more graphics processing units, audio processing components, and the like. For example, in some cases, the selected compute node may render image data and audio data and transmit the rendered data to the client for presentation by the client.

After the content delivery session has been completed between compute node 105 and client 130, management server 120 may determine that the session has been completed. For example, as set forth above, in some cases, management server 120 may monitor compute nodes 101-110 to determine their availability status. Also, in some cases, compute node 105 may send a message to management server 120 indicating that the content delivery session has completed and that compute node 105 has become available for use in another session.

Figure 4:
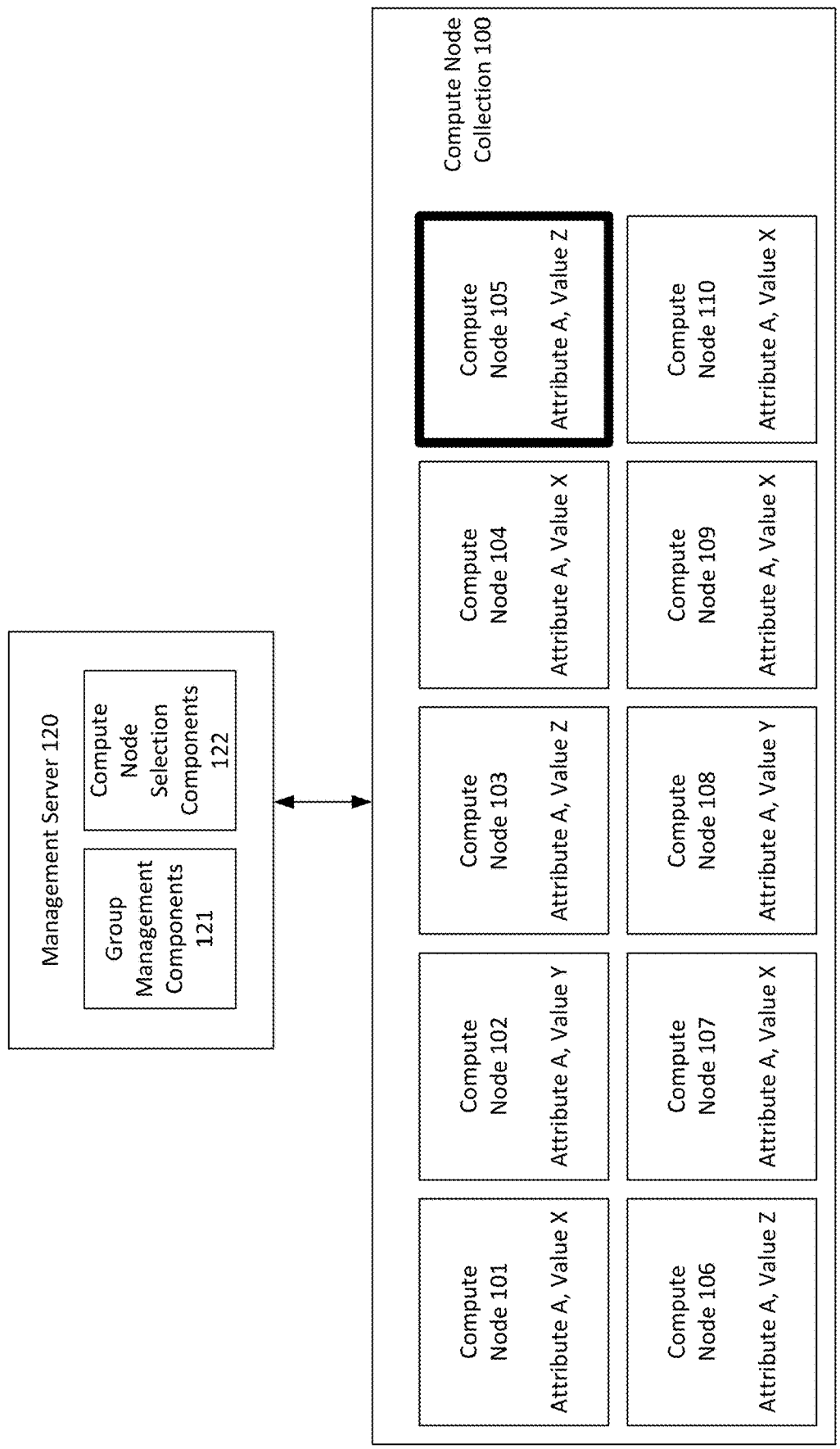
FIG. 4 is a diagram illustrating an example compute node re-assignment that may be used in accordance with the present disclosure.
Figure 5:
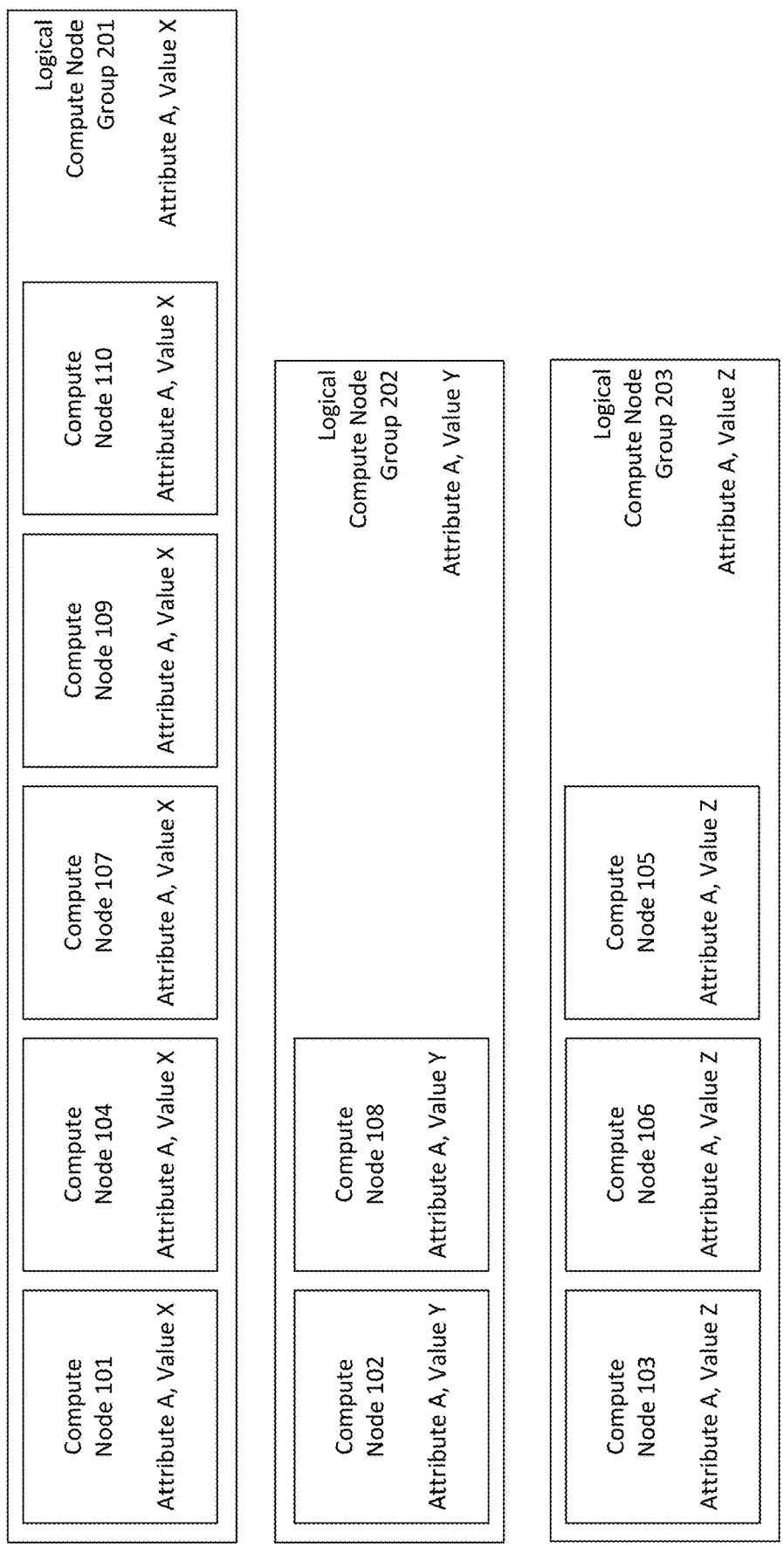
FIG. 5 is a diagram illustrating example adjusted compute node groups that may be used in accordance with the present disclosure.

In some cases, after its session has completed, the session completion status of compute node 105 may be indicated to group management components 121, which may determine a next compute node group to which compute node 105 will be assigned after completion of its session. In some cases, it may be determined that compute node 105 will continue to be assigned to its currently assigned compute node group (i.e., compute node group 202) and that no assignment change will occur. In such cases, compute node 105 may, for example, retain and/or re-load information associated with the content attribute values assigned to its current compute node group (i.e., group 202). By contrast, in other cases, it may be determined that compute node 105 will be re-assigned to another compute node group. In such cases, information associated with the content attribute values assigned to the current compute node group (i.e., group 202) may be deleted from compute node 105 and replaced with information associated with content attribute values assigned to the other compute node group. Referring now to FIG. 4, it is seen that compute node 105 has completed its session with client 130, as indicated by the removal of client 130 from FIG. 4. Additionally, in FIG. 4, it is seen that the content attribute value assigned to compute node 105 has changed from Attribute X, Value Y (as shown previously in FIG. 3) to Attribute X, Value Z (as shown in FIG. 4). Furthermore, referring now to FIG. 5, it is seen that compute node 105 has been re-assigned from logical compute node group 202 (as shown previously in FIG. 2A) to logical compute node group 203 (as shown in FIG. 5). The determination to re-assign compute node 105 from compute node group 202 to compute node group 203 may be based upon various different factors. For example, in some cases, based on current, historical, and/or expected amounts of requests associated with various content attribute values, it may be determined that it is advantageous to increase the quantity of compute nodes in group 203 relative to those in group 202. It is further noted that, in some cases, compute nodes may be evaluated for re-assignment from one compute node group to another at any desired time and not only just after completion of a content delivery session.

Figure 6:
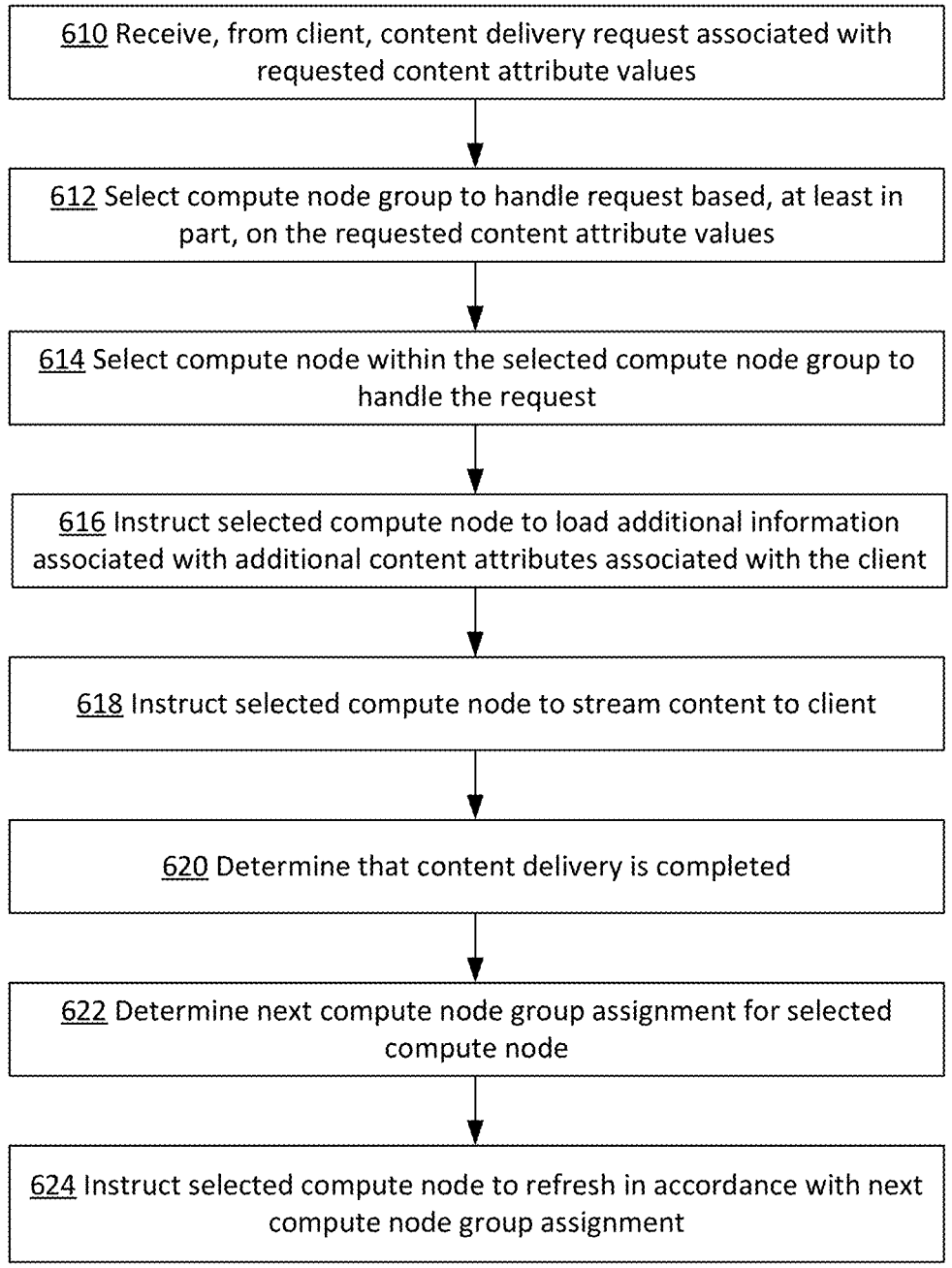
FIG. 6 is a diagram illustrating an example content delivery process that may be used in accordance with the present disclosure.

An example content delivery process in accordance with the disclosed techniques will now be described in detail. In particular, referring now to FIG. 6, at operation 610, a content delivery request is received from a client for content, such as a video game, to be provided to the client. The request may be associated with one or more requested content attribute values, such as, for example, a particular video game level, a particular location, a particular weapon, a particular character, a particular story line, a particular play style, a particular degree of difficulty, and the like. The request may be received by, for example, compute node selection components 122 of FIG. 1.

At operation 612, a particular compute node group is selected to handle the request and provide content to the client. For example, as set forth above, a plurality of compute nodes, such as compute nodes 101-110 of FIG. 1, may be grouped into a plurality of compute nodes groups, such as logical compute groups 201, 202, and 203 of FIG. 2A. Each of the compute node groups may include one or more compute nodes loaded with information associated with one or more assigned content attribute values. As set forth above, in some cases, the attribute values assigned to one or more of the compute node groups may be determined based, at least in part, on factors, such as historical, current and/or expected future amounts of requests associated with content attribute values, loading times associated with content attribute values, or any combinations thereof.

The particular compute node group that will handle the request may be selected, at operation 612, based, at least in part, on the one or more requested content attribute values. For example, in some cases, a compute node group may be selected by matching one or more of the requested content attribute values to one or more content attribute values assigned to the selected compute node group. However, it is not necessarily required that all of the requested content attribute values must match all of the assigned content attribute values.

At operation 614, a particular compute node within the selected compute node group is selected to handle the request and provide content to the client. As set forth above, the particular compute node may, for example, be selected by identifying compute nodes within the selected compute node that are available to handle the request and then selecting one of the available compute nodes based on other factors, such as geographic proximity to the requesting client. In some cases, more than one compute node may be selected at operation 614 to handle the request.

At operation 616, the compute node selected at operation 614 is provided with additional data associated with the client for use in providing content to the client. As set forth above, such additional data may include data indicating one or more content attributes that are requested by the client but that are not already loaded (i.e., pre-loaded) onto the selected compute node. The selected compute node may then, for example, load information associated with the additional data.

At operation 618, the selected compute node is instructed to stream content to the client. The selected compute node may then, for example, launch, or otherwise engage in, a streaming content delivery session with the client. For example, the selected compute node may render image data and audio data and transmit the rendered data to the client.

At operation 620, it is determined that the delivery of content to the client is completed. This may be determined by, for example, group management component 121 of FIG. 1, by, for example, monitoring the availability status of compute nodes, including the selected compute node, and/or receiving a notification from the selected compute node of the completion of content delivery. At operation 622, a next compute node group assignment is determined for the selected compute node. The next compute node group assignment may be, for example, a continued assignment to the same compute node group within which the selected compute node is currently included or a re-assignment to another compute node group. At operation 624, the selected compute node is refreshed in accordance with the next compute node group assignment. For example, if the selected compute node continues to be assigned to its current compute node group, then the selected compute node may, for example, retain and/or re-load information associated with the content attribute values assigned to its current compute node group. By contrast, if the selected compute node is re-assigned to another compute node group, then the content attribute values assigned to the current compute node group may be deleted from the selected compute node and replaced with information associated with content attribute values assigned to the other compute node group.

Figure 7:
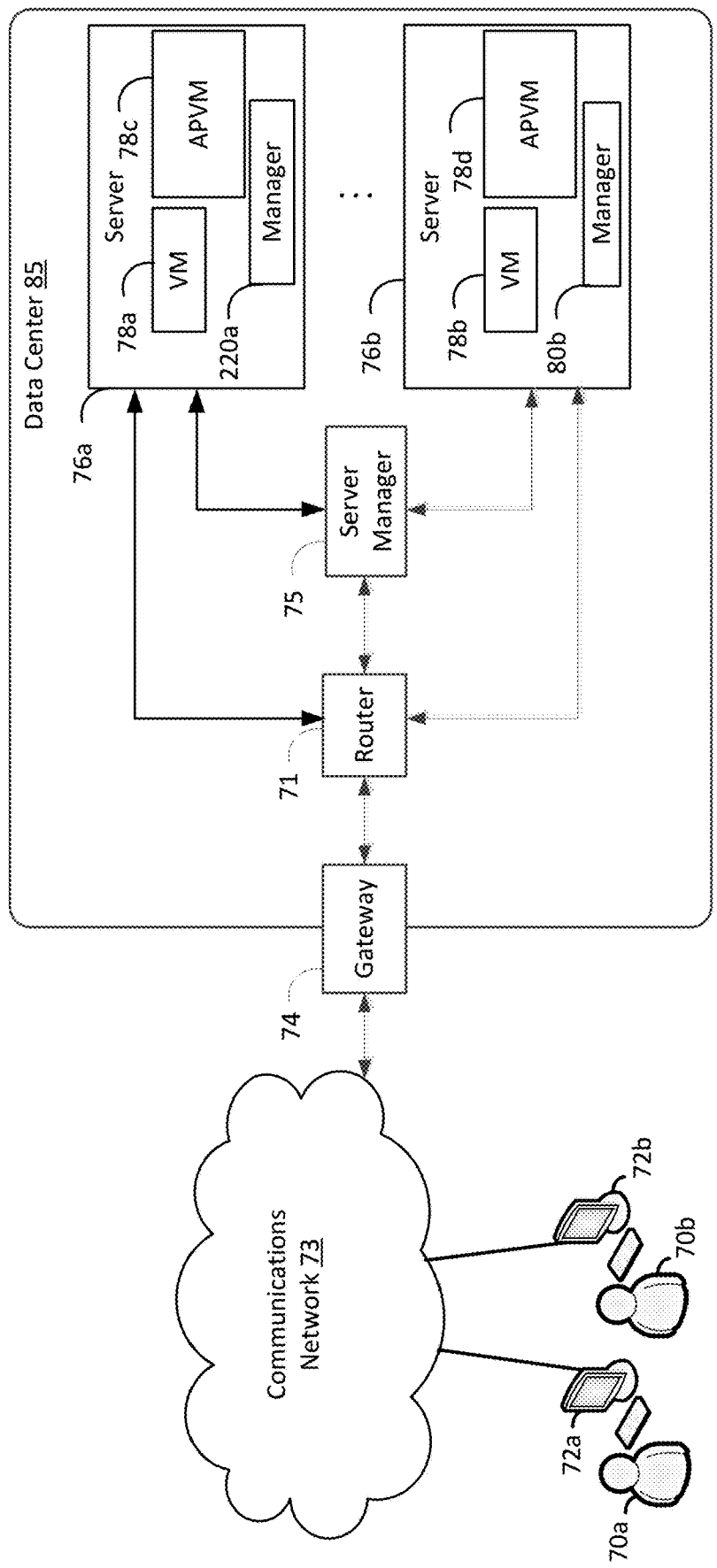
FIG. 7 is a diagram illustrating an example computing system that may be used in accordance with the present disclosure.

An example computing environment that enables rendering and transmission of content to clients will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are attribute pre-loading virtual machine ("APVM") instances. The APVM virtual machine instances 78c and 78d may be configured to perform all, or any portion, of the techniques for pre-loading of content attribute information and/or any other of the disclosed techniques in accordance with the present disclosure and described in detail below. As should be appreciated, while the particular example illustrated in FIG. 7 includes one APVM virtual machine in each server, this is merely an example. A server may include more than one APVM virtual machine or may not include any CCVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be standard servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
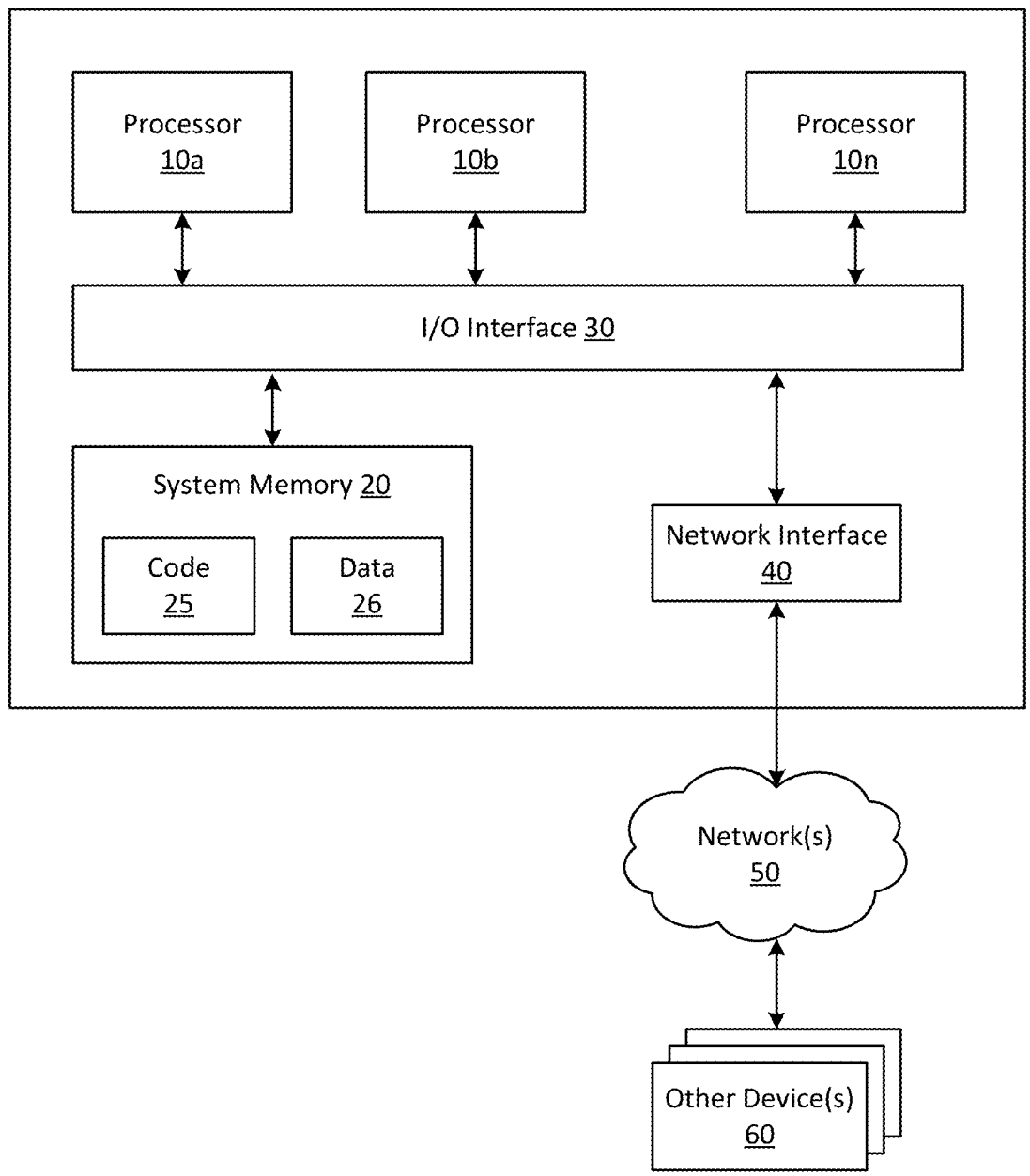
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors; and
   one or more memories to store a set of instructions, which if executed by the one or more processors, causes the one or more processors to perform operations comprising:
      grouping a plurality of compute nodes into a plurality of compute node groups, each of the plurality of compute node groups including one or more compute nodes loaded with information associated with a respective assigned video game level, wherein the respective assigned video game level is different for each of the plurality of compute node groups;
      receiving, from a client, a request for a video game content, wherein the request is associated with at least one requested video game level;
      selecting a first compute node group from the plurality of compute node groups based, at least on part, on an association between the requested video game level and a first video game level that is respectively assigned to the first compute node group; and
      instructing one or more selected compute nodes within the first compute node group to stream the video game content to the client,
      wherein the one or more selected compute nodes access one or more graphics processing units and render image data that is included in the video game content and that is streamed to the client;
      determining when the one or more selected compute nodes have completed streaming of the video game content to the client; and
      in response to completing the streaming of the video game content, determining a next compute node group to which to assign the one or more selected compute nodes, wherein the next compute node group is the first compute node group or a different compute node group.

2. The system of claim 1, wherein the request is further associated with a particular location associated with the video game content.

3. The system of claim 1, wherein the plurality of compute nodes are grouped based, at least in part, on at least one of amounts of requests associated with video game content or loading times associated with video game content.

4. A computer-implemented method for providing content for streaming delivery comprising:
   grouping a plurality of compute nodes into a plurality of compute node groups, each of the plurality of compute node groups including one or more compute nodes loaded with information associated with a respective assigned video game level, wherein the respective assigned video game level is different for each of the plurality of compute node groups;
   receiving, from a client, a request for the content, wherein the request is associated with at least one requested video game level;
   selecting a first compute node group from the plurality of compute node groups based, at least on part, on an association between the requested video game level and a first video game level that is respectively assigned to the first compute node group; and
   instructing one or more selected compute nodes within the first compute node group to stream the content to the client,
   wherein the one or more selected compute nodes access one or more graphics processing units and render image data that is included in the content and that is streamed to the client;
   determining when the one or more selected compute nodes have completed streaming of the content to the client; and
   in response to completing the streaming of the content, determining a next compute node group to which to assign the one or more selected compute nodes, wherein the next compute node group is the first compute node group or a different compute node group.

5. The computer-implemented method of claim 4, wherein the request is further associated with a particular location associated with a video game.

6. The computer-implemented method of claim 4, wherein the plurality of compute nodes are grouped based, at least in part, on at least one of amounts of requests associated with content or loading times associated with content.

7. The computer-implemented method of claim 6, wherein the amounts of requests comprise at least one of current amounts, historical amounts, or expected amounts.

8. The computer-implemented method of claim 4, wherein the one or more compute nodes included within each of the plurality of compute node groups comprise at least one of a server or a virtual machine.

9. One or more non-transitory computer-readable storage media having stored thereon instructions that, upon execution by one or more computing devices, cause the one or more computing devices to perform operations comprising:
   grouping a plurality of compute nodes into a plurality of compute node groups, each of the plurality of compute node groups including one or more compute nodes loaded with information associated with a respective assigned video game level, wherein the respective assigned video game level is different for each of the plurality of compute node groups;
   receiving, from a client, a request for content, wherein the request is associated with at least one requested video game level;
   selecting a first compute node group from the plurality of compute node groups based, at least on part, on an association between the requested video game level and a first video game level that is respectively assigned to the first compute node group; and
   instructing one or more selected compute nodes within the first compute node group to stream the content to the client,
   wherein the one or more selected compute nodes access one or more graphics processing units and render image data that is included in the content and that is streamed to the client;
   determining when the one or more selected compute nodes have completed streaming of the content to the client; and
   in response to completing the streaming of the content, determining a next compute node group to which to assign the one or more selected compute nodes, wherein the next compute node group is the first compute node group or a different compute node group.

10. The one or more non-transitory computer-readable storage media of claim 9, wherein the request is further associated with a particular location associated with a video game.

11. The one or more non-transitory computer-readable storage media of claim 9, wherein the plurality of compute nodes are grouped based, at least in part, on at least one of amounts of requests associated with content or loading times associated with content.

12. The one or more non-transitory computer-readable storage media of claim 11, wherein the amounts of requests comprise at least one of current amounts, historical amounts, or expected amounts.

13. The one or more non-transitory computer-readable storage media of claim 9, wherein the one or more compute nodes included within each of the plurality of compute node groups comprise at least one of a server or a virtual machine.

* * * * *